United States Patent [19]
DePaula

[11] Patent Number: 4,911,460
[45] Date of Patent: Mar. 27, 1990

[54] TRAILER TONGUE JACK DEVICE

[76] Inventor: Alfonso DePaula, 1000 N. Central Ave., Umatilla, Fla. 32784

[21] Appl. No.: 309,210

[22] Filed: Feb. 13, 1989

[51] Int. Cl.⁴ ............................................. B60D 1/06
[52] U.S. Cl. ............................. 280/478.1; 280/479.1; 254/85; 254/120
[58] Field of Search ................... 280/477, 478.1, 504, 280/511, 479.3, 456.1, 462, 465, 467, 470, 765.1; 254/84, 85, 424, 420; 72/446, 476; 238/10 R; 248/49

[56] References Cited

U.S. PATENT DOCUMENTS

| | | | |
|---|---|---|---|
| 1,131,018 | 3/1915 | Troutman | 254/85 |
| 2,885,462 | 5/1959 | Sylvester | 248/49 X |
| 2,917,323 | 12/1959 | Mandekic | 280/470 |
| 3,084,953 | 2/1960 | McGregor | 280/477 X |
| 3,181,891 | 5/1965 | Moats | 280/765.1 X |
| 3,765,703 | 10/1973 | Voelkerding et al. | 280/477 |
| 3,922,007 | 11/1975 | Friedebach | 280/456.1 |

Primary Examiner—Charles A. Marmor
Assistant Examiner—Alan M. Kagen
Attorney, Agent, or Firm—Macdonald J. Wiggins

[57] ABSTRACT

A lateral trailer tongue jack has a base plate for resting on a ground surface beneath a trailer tongue. The base includes a lateral channel iron track having a framework disposed over the track. A vertically oriented tubular socket has a wheel mounted at a lower end thereof which rides in the track. A lead screw disposed laterally across the framework is engaged with a threaded floating carriage within the socket. The socket accepts the lower end of a vertical tongue jack of the trailer. A crank attached to the lead screw is used to move the socket laterally along the track to align the trailer tongue hitch socket with the hitch ball of a towing vehicle.

10 Claims, 1 Drawing Sheet

TO POWER SOURCE

TRAILER TONGUE JACK DEVICE

FIELD OF THE INVENTION

The present invention relates to a jack for vehicle trailer tongues, and more particularly to a jack for moving a trailer tongue laterally to facilitate coupling to a towing vehicle.

DESCRIPTION OF THE PRIOR ART

The use of travel trailers is widespread and many families enjoy travel with the convenience of overnight stays in trailer camps and the like. It is common to park the trailer and uncouple the towing vehicle for local use. Various jack devices are known for supporting the tongue end of the trailer in a level position during parking; such devices include jacks for moving the tongue vertically for leveling. Such jacks also are used during hitching to the towing vehicle to align the hitches vertically. However, many persons have difficulty in backing the towing vehicle so as to have the hitch ball on the vehicle aligned laterally with the trailer hitch socket. The weight of the trailer tongue inhibits manual lateral alignment of the trailer hitch, thus requiring repeated attempts at backing of the vehicle.

Prior art devices for facilitating the hitching operation include U.S. Pat. No. 3,084,953 to McGregor which discloses a metal track which is placed on the ground. A caster on the lower end of the vertical tongue jack is placed in the track. The trailer must then be pushed laterally by hand to align the hitches. Adjustable tongues are known in the art as exemplified by U.S. Pat. Nos. 839,518; 1,039,051; and 3,191,967. However, these devices require complete reconstruction of the tongue and are not suitable for existing trailers.

Thus, there is a need for a simple jack device that can be used with any existing trailer tongue and which has sufficient mechanical advantage as to permit operation by anyone to quickly and easily move the trailer tongue laterally into alignment with a trailer hitch.

SUMMARY OF THE INVENTION

The present invention is a jack for a trailer tongue to be placed on the ground beneath the tongue and engaged with an existing vertical tongue jack. The jack of the invention includes a broad, rectangular base plate, preferable of steel, having cleats for engaging soft ground. The jack is to be placed on the ground with the long sides of the base plate at a right angle to the center line of the trailer under the vertical tongue jack. A track formed of channel iron or the like is attached to the base plate. A pair of metal uprights is disposed at the ends of the track and a horizontal lead screw is mounted between the uprights. A vertical jack socket formed from a section of steel pipe or tubing has a steel wheel disposed at its lower end which rides in and along the track. The jack socket includes an inner floating carriage having internal threads through which the lead screw is threaded. At one outer end of the lead screw, means for attaching a hand crack is provided. Operation of the crank results in movement of the jack socket and the metal wheel along the track and between the uprights.

To use the lateral tongue jack, the lower end of the existing trailer vertical jack is inserted into the upper end of the jack socket. A rest within the socket is provided for the lower end of the vertical jack. The lateral jack is placed with its base plate at rgght angles with the trailer center line, and with the vertical tube initially centered along the track. As will now be recognized, the trailer tongue can be easily adjusted laterally during the hitching operation by using the hand crank to move the hitch socket in exact alignment with a vehicle trailer hitch ball. The floating carriage allows the baseplate to be on sloping or uneven ground without binding during adjustment.

The lateral tongue jack of the invention thus permits a towing vehicle to be backed toward the trailer tongue and easily positioned so that the hitch ball is on a line laterally with the hitch socket of the trailer tongue. The lateral jack crank is then operated to bring the socket directly over the ball and the vertical jack lowered to complete the coupling.

It is therefore a principal object of the invention to provide a lateral tongue jack to facilitate coupling of a trailer to a towing vehicle without the necessity of accurate backing of the vehicle.

It is another object of the invention to provide a lateral tongue jack which is usable on soft, uneven, or sloping ground.

It is still another object of the invention to provide a lateral tongue jack which permits ease of movement of the tongue of a trailer laterally to align the hitch socket with the hitch ball of the towing vehicle.

It is yet another object of the invention to provide a lateral tongue jack that is usable with almost any trailer tongue having a vertical tongue jack.

These and other objects and advantages will become apparent from the following detailed description when read in conjunction with the drawings.

DETAILED DESCRIPTION OF THE PREFERRED EMBODIMENT

Figure 1:
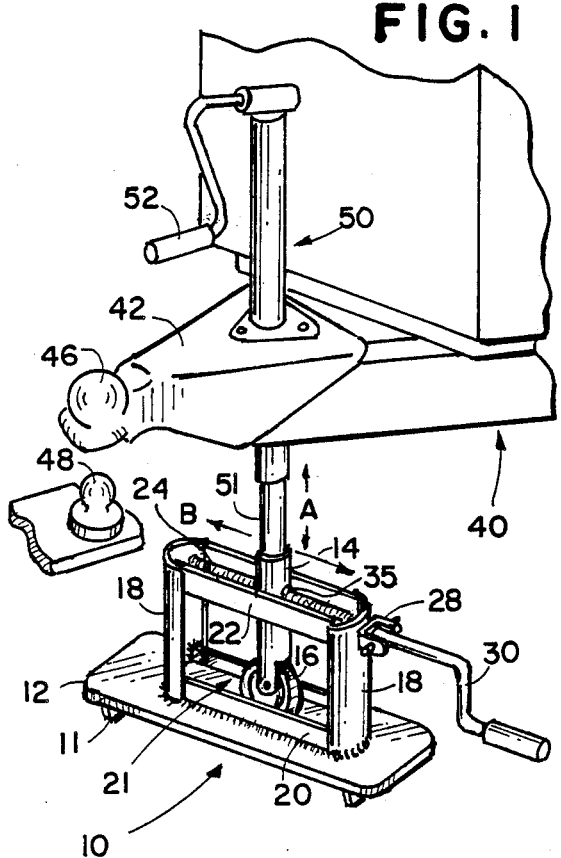
FIG. 1 is a perspective view of the lateral tongue jack of the invention shown engaged with a typical trailer tongue.

Referring to FIG. 1 of the drawings, a perspective view of a trailer 40 having a tongue assembly 42 is shown, with tongue assembly 42 being supported by a preferred embodiment of the lateral tongue jack 10 of the invention. Jack 10 has a rectangular base plate 12 formed preferably from steel plate, with cleats 11 on the underside thereof which engage the ground. A steel track 20, which may be formed from channel stock, is welded to base plate 12. A pair of vertical support members 18 is welded to base plate 12 and are connected at the upper ends thereof by brace members 22. Although support members 18 are shown formed from semi-cylindrical stock, other shapes are suitable for the purpose.

A lead screw 24 is disposed from one support member 18 to the other and supported by suitable end bearings. A crank yoke 28 is disposed on one end of lead screw 24 for attachment to hand crank 30. Preferably, crank 30 is removable from yoke 28 for ease of storage when jack 10 is not in use.

Figure 2:
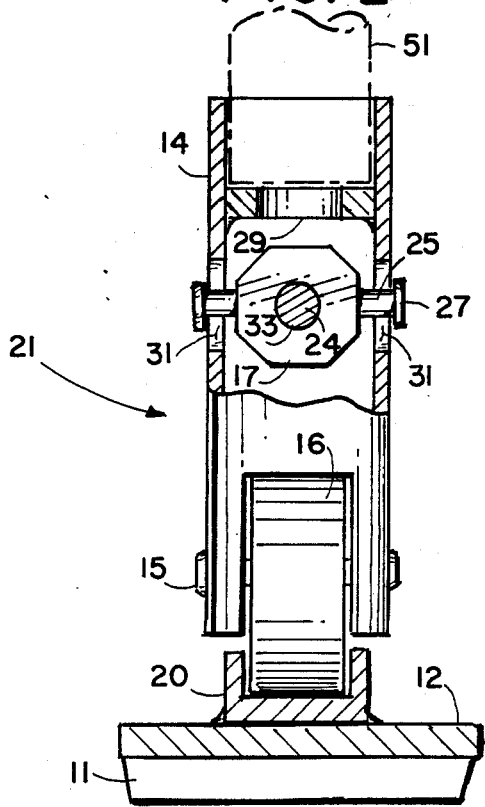
FIG. 2 is a cross section of the jack of FIG. 1 through the jack socket portion thereof.
Figure 3:
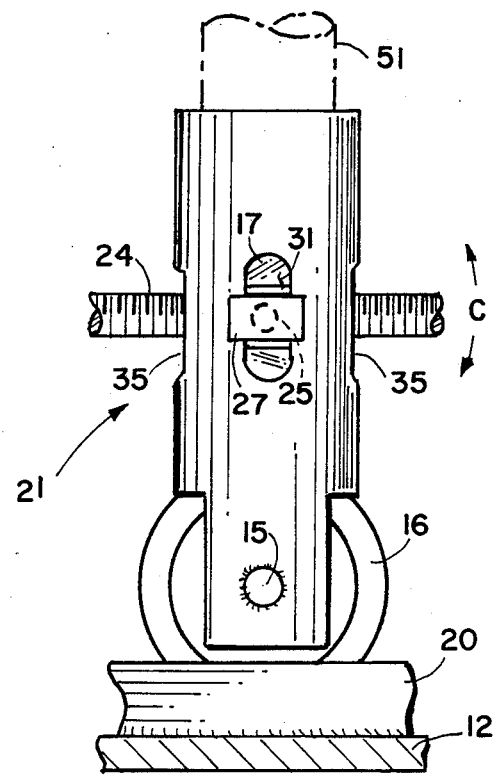
FIG. 3 is a side view of the jack socket portion.

Lead screw 24 is engaged with vertical jack socket assembly 21. Details of assembly 21 are shown in the partial cross sectional view of FIG. 2 and in FIG. 3. A vertical socket 14 is formed from steel tubing or the like and includes an inside diameter to accept a typical cylindrical post 51 of an existing vertical tongue jack. A vertical tongue jack post support 29 is welded inside of socket 14 as shown in FIG. 2 for a member 51 to rest upon. A carriage element 17 having guide rods 25 extending therefrom is disposed within socket 14. Rods 25 extend through a pair of slots 31 in socket 14 and are captivated by end pieces 27. Thus, carriage element 17 is free to rotate and move vertically as will be discussed hereinbelow. Lead screw 24 extends through a pair of vertical slots 35 in socket 14.

Carriage element 17 includes a threaded bore 33 through which lead screw 24 is threaded. As will now be noted from FIG. 1, operation of hand crank 30 will cause vertical socket assembly 21 to move laterally. The lower end of socket 14 includes a steel wheel 16 mounted therein by axle 15. Wheel 16 rides in track 20. Thus, the weight of tongue 42 of FIG. 1 is supported by socket 14, wheel 16, track 20 and base 12. Since carriage element 17 essentially floats within socket 14, any binding of lead screw 24 is prevented. If the ground surface upon which base plate 12 is resting slopes laterally, carriage 17 can rotate slightly about guide rods 25, as indicated by arrows C in FIG. 3, permitting socket 14 to remain vertical.

Having described the lateral tongue jack of the invention, the use will now be described with reference to FIG. 1. Trailer 40 is shown having a manually operated vertical tongue jack 50 in which post 51 is adjustable vertically, as indicated by arrow A by hand crank 52. In many instances, an electric motor drive is provided for the vertical jack. As supplied, post 51 may have an end device, such as ground pad or a caster attached at its lower end. In such case, the end device is removed to permit post 51 to be inserted into socket 14 of lateral jack 10. The trailer is parked, jack 10 is placed as shown beneath post 51 and the vertical jack operated to permit post 51 to engage socket 14. The vertical jack is next raised to uncouple hitch socket 46 from hitch ball 48, and thereafter, to level trailer 40. When it is desired to move or tow trailer 40, the towing vehicle is backed to bring hitch ball 48 close to and in a lateral line with hitch socket 46. Crank 30 is operated to -swing hitch socket 46 directly over hitch ball 48, either left or right as indicated by arrows B. Jack 50 is then operated to lower hitch socket 46 to engage hitch ball 48. Post 51 is raised to release jack 10 which may then be stowed.

Figure 4:
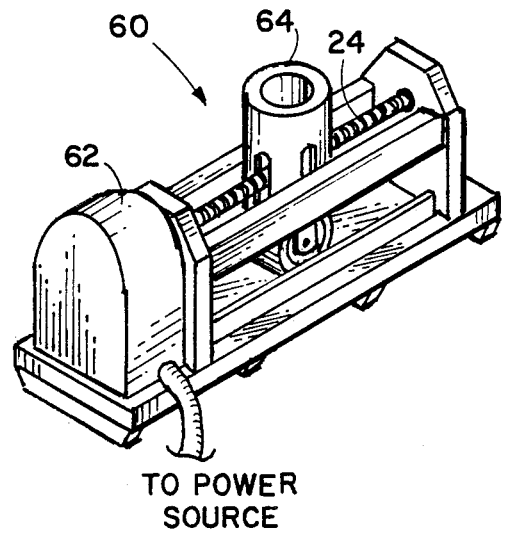
FIG. 4 is a perspective view of a powered jack in accordance with the invention.

Although a manually operated jack 10 has been described, an electric, hydraulic or pneumatic motor may be used operate the lead screw. FIG. 4 shows a perspective view of a heavy duty lateral tongue jack 60 that is suitable for handling large commercial trailers or recreational trailers. A suitably gear box and drive motor 62 is coupled to lead screw 24 to move socket 64 laterally.

The invention has been described with reference to specific structures for exemplary purposes. It will be obvious to those of skill in the art to make various modifications in design. Such modifications are considered to fall within the spirit and scope of the invention.

I claim:

1. A vehicle trailer lateral tongue jack for use with a trailer having a vertical tongue jack, comprising:
   a base plate for resting on a ground surface;
   an elongate track attached to said base plate:
   a frame disposed over said track and attached to said base plate;
   a vertically oriented socket element having a wheel operatively disposed at a lower end thereof, said wheel adapted to move along said track;
   a floating carriage element movably disposed within, and coupled to, said socket element, said carriage element having a threaded bore therethrough;
   a lead screw disposed across said frame parallel with said track and threaded through said threaded bore of said carriage element;
   support means at an upper end of said socket element for supporting a lower end of said vertical tongue jack; and
   means attached to said lead screw for rotation of said lead screw to thereby move said socket element and said wheel along said track.

2. The lateral tongue jack as defined in claim 1 in which said rotating means is a hand crank.

3. The lateral tongue jack as defined in claim 2 in which said hand crank is detachable from said lead screw.

4. The lateral tongue jack as defined in claim 1 in which said rotating means is a drive motor.

5. The lateral tongue jack as defined in claim 1 in which said socket element includes a first pair of elongate slots through which said lead screw is disposed, and a second pair of elongate slots through which coupling pins pass for coupling said carriage element to said socket element, whereby said carriage element is free to rotate about a horizontal axis and to move vertically to thereby maintain said socket element vertical when said base plate rests on a non-level ground surface.

6. The lateral tongue jack as defined in claim 1 in which:
   said socket element is formed from a steel tube; and
   said support means is a metal block attached within said steel tube.

7. The lateral tongue jack as defined in claim 1 in which said track is a length of channel iron.

8. The lateral tongue jack as defined in claim 1 in which said base plate includes cleat means for engaging a soft ground surface.

9. A vehicle trailer lateral tongue jack for use with a trailer having a vertical tongue jack, said lateral tongue jack for aligning a trailer hitch of said trailer laterally with a trailer hitch of a towing vehicle, comprising:
   an essentially rectangular base plate for resting on a ground surface;
   an elongate channel track attached to said base plate, said track to be disposed at a right angle to a center line of said trailer;
   an essentially rectangular framework disposed over said track and attached to said base plate;
   a hollow vertical socket having a wheel attached at a lower end thereof, said wheel disposed to ride in said channel track and movable along the length of said track, said socket including means at an upper end thereof for temporarily coupling to said trailer tongue;
   a floating carriage disposed within said socket, said carriage having a threaded bore aligned parallel with said track and having a pair of guide rods disposed at right angles to said bore, said socket having a pair of vertcally oriented slots through sidewalls thereof for captivating said rods;
   a lead screw disposed within said framework, parallel with said track, and threaded through said carriage bore, ends of said lead screw being supported by said framework; and crank means for rotating said lead screw to thereby move said socket laterally along said channel track.

10. A vehicle trailer lateral tongue jack for use with a trailer having a vertical tongue jack, comprising:
   a base plate for resting on a ground surface;
   an elongate track attached to said base plate:
   a frame disposed over said track and attached to said base plate;
   a vertically oriented socket element having a wheel operatively disposed at a lower end thereof, said wheel adapted to move along said track;
   a lead screw disposed across said frame parallel with said track;
   a carriage element movably disposed within, and coupled to, said socket element, said carraige element having a threaded bore therethrough, said socket element includes a first pair of elongate slots through which said lead screw is disposed, and a second pair of elongate slots through which coupling pins pass for coupling said carraige element to said socket element, whereby said carriage element is free to rotate about a horizontal axis and to move vertically to thereby maintain said socket element vertical when said base plate rests on a non-level ground surface;
   support means at an upper end of said socket element for supporting a lower end of said vertical tongue jack; and
   means attached to said lead screw for rotation of said lead screw to thereby move said socket element and said wheel along said track.

* * * * *